United States Patent
Dow et al.

(10) Patent No.: US 9,891,944 B2
(45) Date of Patent: *Feb. 13, 2018

(54) STEGANOGRAPHIC MESSAGE PASSING BETWEEN A VIRTUAL MACHINE AND A HYPERVISOR

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Frank R. LeFevre, Poughkeepsie, NY (US); Jessie Yu, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/072,381

(22) Filed: Mar. 17, 2016

(65) Prior Publication Data

US 2017/0123834 A1 May 4, 2017

Related U.S. Application Data

(63) Continuation of application No. 14/926,215, filed on Oct. 29, 2015.

(51) Int. Cl.
*G06F 9/455* (2006.01)

(52) U.S. Cl.
CPC .......... *G06F 9/45558* (2013.01); *G06F 2009/45583* (2013.01); *G06F 2009/45591* (2013.01)

(58) Field of Classification Search
None
See application file for complete search history.

(56) References Cited

U.S. PATENT DOCUMENTS

| 6,011,849 A * | 1/2000 | Orrin | H04L 9/065 380/37 |
| 7,039,189 B1 * | 5/2006 | Kienzle | H04L 63/0428 380/210 |
| 8,036,418 B2 * | 10/2011 | Meyer | G06T 1/0021 382/100 |

(Continued)

OTHER PUBLICATIONS

Younhee Kim et al.; "Modified Matrix Encoding Technique for Minimal Distortion Steganography" George Mason University; Springer-Verlag Berlin Heidelberg 2007 (Kim_2007.pdf; pp. 314-327).*

(Continued)

*Primary Examiner* — Hiren Patel
(74) *Attorney, Agent, or Firm* — Cantor Colburn LLP; Steven Chiu

(57) ABSTRACT

A computer-implemented method may include identifying a plurality of selected bits of usage data of a virtual machine. A desired message may be encoded, by a computer processor, as a steganographic message stored in the plurality of selected bits in the usage data. Encoding the desired message may include manipulating one or more resources of the virtual machine to cause a change in the plurality of selected bits in the usage data. The usage data may be provided to the hypervisor, and the steganographic message may be observable in the usage data.

6 Claims, 6 Drawing Sheets

(56) References Cited

U.S. PATENT DOCUMENTS

| | | | | |
|---|---|---|---|---|
| 8,549,305 B2* | 10/2013 | Moskowitz | ........... | G06T 1/0021 380/28 |
| 2001/0010730 A1* | 8/2001 | Rhoads | ................. | G06F 21/445 382/100 |
| 2002/0056041 A1* | 5/2002 | Moskowitz | ........... | H04L 9/3236 713/176 |
| 2006/0115110 A1* | 6/2006 | Rodriguez | ............... | B41M 3/10 382/100 |
| 2006/0233420 A1* | 10/2006 | Rhoads | ............. | G06F 17/30876 382/100 |
| 2007/0195991 A1* | 8/2007 | Rhoads | ................ | G06Q 20/341 382/100 |
| 2008/0112590 A1* | 5/2008 | Stach | ................... | G06T 1/0064 382/100 |
| 2008/0301504 A1* | 12/2008 | Chen | .................... | G06F 11/008 714/42 |
| 2009/0013074 A1* | 1/2009 | Rice | ..................... | G06F 21/552 709/224 |
| 2009/0138534 A1* | 5/2009 | Lee | ........................ | G06F 7/762 708/209 |
| 2009/0158443 A1* | 6/2009 | Dias | ........................ | G06F 21/10 726/32 |
| 2010/0057792 A1* | 3/2010 | Ylonen | ............... | G06F 12/0253 707/E17.009 |
| 2010/0077128 A1* | 3/2010 | Stansell | ................ | G06F 9/5016 711/6 |
| 2011/0016512 A1* | 1/2011 | Colon | ................... | G06T 1/0021 726/4 |
| 2011/0296234 A1* | 12/2011 | Oshins | ............... | G06F 9/45558 714/5.11 |
| 2012/0311577 A1* | 12/2012 | Lee | ..................... | G06F 9/45558 718/1 |
| 2013/0191845 A1* | 7/2013 | Koumori | ................ | G06F 9/505 718/105 |
| 2013/0238901 A1* | 9/2013 | Wise | ..................... | H04N 1/32702 713/168 |
| 2014/0181825 A1* | 6/2014 | He | ........................ | G06F 9/5027 718/102 |
| 2015/0026807 A1* | 1/2015 | Lutas | .................. | G06F 12/1009 726/23 |
| 2016/0365979 A1* | 12/2016 | Mai | ....................... | H04L 9/3247 |

OTHER PUBLICATIONS

Eli M. Dow, et al., "Steganographic Message Passing Between a Virtual Machine and a Hypervisor", U.S. Appl. No. 14/926,215, filed Oct. 29, 2015.

List of IBM Patents or Patent Applications Treated as Related; (Appendix P), Filed Apr. 3, 2016; 2 pages.

* cited by examiner

US 9,891,944 B2

STEGANOGRAPHIC MESSAGE PASSING BETWEEN A VIRTUAL MACHINE AND A HYPERVISOR

DOMESTIC PRIORITY

This application is a continuation of U.S. patent application Ser. No. 14/926,215, filed Oct. 29, 2015, the disclosure of which is incorporated by reference herein in its entirety.

BACKGROUND

Embodiments of the present invention relate to virtual machines and, more specifically, to steganographic message passing between a virtual machine and a hypervisor.

In some circumstances, a virtual machine (VM) desires to convey information to the hypervisor on which it runs. Often, due to security considerations, it is inadvisable to use traditional networking for communications between the hypervisor and the VM. However, the hypervisor application programming interface might not have existing provisions for direct multipurpose VM to hypervisor communications. Further, the modification of a guest kernel, such as that used by the VM, might be strictly prohibited.

SUMMARY

According to an embodiment of this disclosure, a computer-implemented method includes identifying a plurality of selected bits of usage data of a virtual machine. A desired message may be encoded, by a computer processor, as a steganographic message stored in the plurality of selected bits in the usage data. Encoding the desired message may include manipulating one or more resources of the virtual machine to cause a change in the plurality of selected bits in the usage data. The usage data may be provided to the hypervisor, and the steganographic message may be observable in the usage data.

In another embodiment, a system includes a memory having computer readable instructions and one or more processors for executing the computer readable instructions. The computer readable instructions include identifying a plurality of selected bits of usage data of a virtual machine. Further according to the computer readable instructions, a desired message may be encoded as a steganographic message stored in the plurality of selected bits in the usage data. Encoding the desired message may include manipulating one or more resources of the virtual machine to cause a change in the plurality of selected bits in the usage data. The usage data may be provided to the hypervisor, and the steganographic message may be observable in the usage data.

In yet another embodiment, a computer program product for providing a steganographic message to a hypervisor includes a computer readable storage medium having program instructions embodied therewith. The program instructions are executable by a processor to cause the processor to perform a method. The method includes identifying a plurality of selected bits of usage data of a virtual machine. Further according to the method, a desired message may be encoded as a steganographic message stored in the plurality of selected bits in the usage data. Encoding the desired message may include manipulating one or more resources of the virtual machine to cause a change in the plurality of selected bits in the usage data. The usage data may be provided to the hypervisor, and the steganographic message may be observable in the usage data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Conventionally, to enable a virtual machine (VM) to transmit messages to a hypervisor over which it runs, an administrator may install a specialized agent configured to handle such messaging. However, this is costly in terms of labor, in that the agent must be produced and then installed on each VM in which this type of messaging is desired.

In contrast, various embodiments of this disclosure enable a VM to communicate with its hypervisor through steganographic messaging. VMs are often encapsulated in such a way that the usage data of the VM can be easily monitored and measured by the hypervisor. Types of measured usage data may include such items as central processing unit (CPU) consumption, memory consumption, memory paging rates, page fault counters, network bytes sent, network bytes received, and memory bytes read and written per time unit. The communication to the hypervisor of the usage data is almost universal, because usage data are widely used by system management software, charge back in utility computing, or hosted cloud computing models.

According to this disclosure, some embodiments of a messaging system incorporate steganographic messages into the communications of these measurements. In other words, the messaging system may use VM usage data, as monitored by the hypervisor using out of band monitoring techniques during VM runtime, to convey information from the VM to the hypervisor by the manipulation of resource demands and steganography. Through this mechanism, a signal of potentially arbitrary length and payload may be conveyed from the VM to the hypervisor, or hypervisor-like firmware, using steganographic encoding techniques. As a result, with embodiments of the messaging system, the VM may covertly pass messages to the hypervisor without the use of installed agents. Some embodiments of the messaging system may be particularly useful in hypervisor deployments where the VM's memory pages are encrypted or otherwise obfuscated from the hypervisor. In these cases, the hypervisor would be unable to infer information about the VM based on the memory pages, and thus, the mechanism for message passing disclosed herein may be especially valuable.

Figure 1:
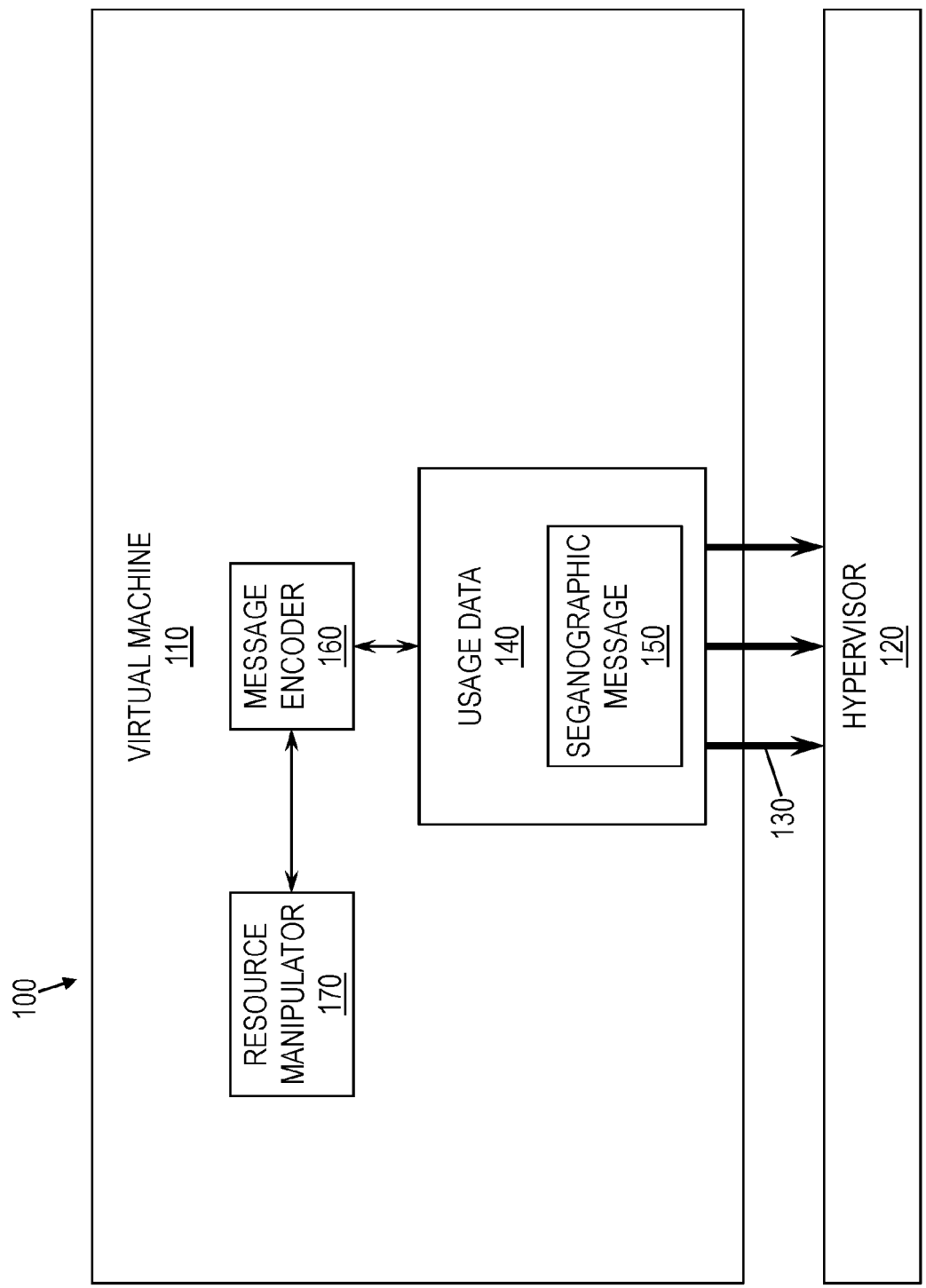
FIG. 1 is a block diagram of a messaging system, according to some embodiments of this disclosure.

FIG. 1 is a block diagram of a messaging system 100, according to some embodiments of this disclosure. As shown, the messaging system 100 may include a VM 110 running over a hypervisor 120. Although only a single VM 110 is shown, it will be understood that multiple VMs 110 may run over the hypervisor 120, and that each VM 110 may pass messages to the hypervisor 120 as described in this disclosure.

Further, as shown, the hypervisor 120 may monitor usage data 140 of the VM 110. The message encoder 160 of the VM 110 may incorporate a steganographic message 150 into the usage data 140 observable by the hypervisor 120 via conventional insight mechanisms. This usage data 140 may include, for example, measurements of CPU consumption, memory consumption, memory paging rates, page fault counters, network bytes sent, network bytes received, memory bytes read, memory bytes written, or various other measurements.

In some embodiments, one or more communication channels 130 may effectively be formed through the hypervisor's monitoring of the VM 110, where the usage data 140 is, by way of the observation, provided across those communication channels 130. Further, in some embodiments, usage data 140 for each metric being used may be provided over a communication channel 130 associated with that metric. For instance, a first communication channel 130 may be used to provide usage data 140 related to CPU consumption, while a second communication channel 130 may be used to provide usage data 140 related to page faulting. As described in detail below, a steganographic message 150 may be included in the usage data 140 provided through the communication channels 130.

Generally, steganography is used to communicate securely by way of hidden data. Steganography may be useful not only in keeping non-authorized others from reading the hidden data, but also in keeping those others from even knowing the hidden data is being communicated. In the messaging system 100, steganography may be used to hide a message under the guise of performing a core function, specifically, for instance, the hypervisor's monitoring of the VM's usage data 140 for various purposes. Thus, the usage data 140 may act as a carrier, or cover-object, in which the steganographic message 150 is hidden.

In traditional digital steganography, electronic communications may include steganographic coding inside a document file, image file, program, or protocol. Media files work well for steganographic transmission because of their large size. For example, a sender might use an innocuous image file and might adjust the color of every 100th pixel to correspond to a letter that makes up a portion of a message. This change might be so subtle that someone not specifically looking for it is unlikely to notice it, and thus, the sender could use the modified image file to pass a message made up of the included letters. In that case, the image file acts as the carrier, or cover-object, for the message.

Conventionally, usage data 140 may be provided from the VM 110 to the hypervisor 120 across the communication channels 130. This can occur, for example, by way of a hypercall, or through an agent installed in the VM 110 and having network or other specialized connectivity, such as shared memory buffers, to the hypervisor 120. For example, and not by way of limitation, the communication channels 130 may provide the usage data 140 as continuous data in the form of a stream of bytes, characters, or other segments. In some embodiments, a predetermined set of selected bits of those segments may be used by the message encoder 160 to encode the steganographic message 150, where both the VM 110 and the hypervisor 120 may be aware of which bits are the selected bits. For instance, one or more of the least significant bits of each segment may be used as the selected bits for that segment. A resource manipulator 170 of the VM 110, which may be one or more applications or lightweight agents, may be in communication with the message encoder 160 and may manipulate the resources being measured to modify those selected bits. In this manner, a steganographic message 150 may be encoded in a plurality of selected bits spanning multiple segments, and may thus be conveyed to the hypervisor 120 in the usage data 140.

The hypervisor 120 may be aware that the VM 110 is configured to provide the steganographic message 150, and the hypervisor 120 may be configured to observe and decode the steganographic message 150, by extracting it from the usage data 140 and restoring it to the original message.

In some embodiments, the hypervisor 120 may assume that a steganographic message 150 is being received, and may thus extract the selected bits used for messaging. The hypervisor 120 may attempt to decode the extracted data as a steganographic message 150. If, when decoded, the extracted data does not produce a legitimate message to the hypervisor 120, the hypervisor 120 may recognize that the decoded data is not a steganographic message 150 and may thus discard it. Further, the VM 110 may repeat a steganographic message 150 back-to-back one or more times within the usage data 140, thus providing the hypervisor 120 multiple attempts to detect and decode the full steganographic message 150.

In some embodiments, instead of the hypervisor 120 continuously searching for steganographic messages 150, the VM 110 may provide a clue in the usage data 140 indicating when a steganographic message 150 is being provided. For example, and not by way of limitation, at least one of the communication channels 130 may be used to indicate the beginning of a steganographic message 150. For instance, a communication channel 130 used for the communication of usage data 140 related to CPU consumption may be used for this purpose, such that a value of 1 in the final bit of a segment provided through this communication channel 130 indicates the beginning of a steganographic message 150 across the communication channels 150. When detecting this indication, the hypervisor 120 may then begin to detect and decode the steganographic message 150 in the incoming data streams.

To further conceal the steganographic message 150, in some embodiments, the VM 110 and hypervisor 120 may use a password, or steganographic key (stego-key), to encrypt the steganographic message 150. In that case, the VM 110 may encrypt the original message it desires to send, and may manipulate one or more resources to incorporate the message into the usage data 140 as a steganographic message 150, such that the steganographic message 150 is included in encrypted form in the usage data 140 delivered to the hypervisor 120. The hypervisor may decrypt the steganographic message 150 after detecting it in the usage data 140.

As mentioned above, various resources may be manipulated to provide the steganographic message 150 in the usage data 140. In a steganographic encoding process, the VM 110 may identify selected bits to modify in the usage data 140. The VM 110 may select a subset of the selected bits to be replaced with data from a message desired to be sent as a steganographic message 150. The VM 110 may replace the selected bits with bits corresponding to the steganographic message 150 by artificially varying resource consumption in such a way as to induce a change in the selected bits. Below, some specific examples of manipulating resources for this purpose are described.

Figure 2:
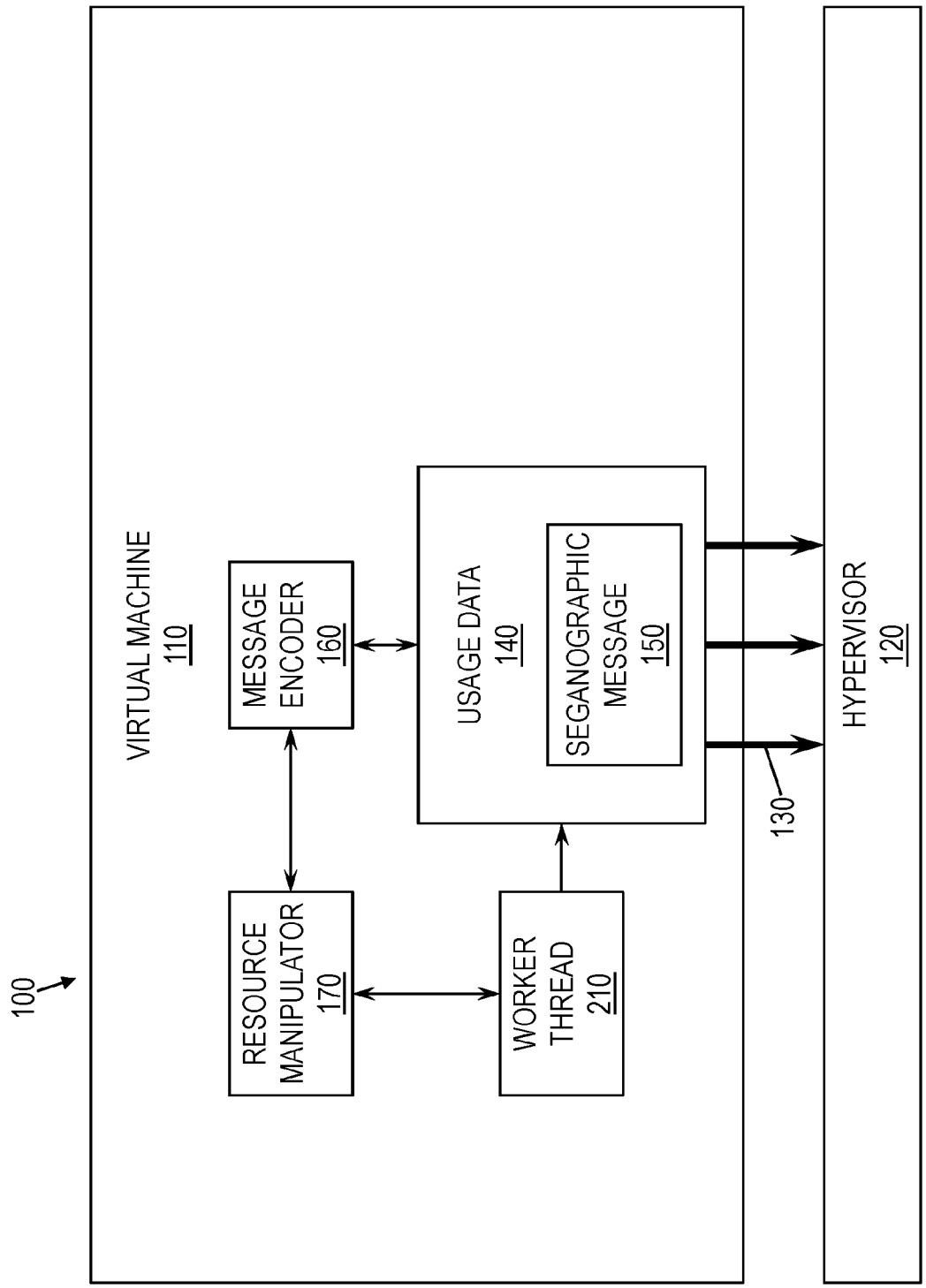
FIG. 2 is another block diagram of the messaging system, illustrating the manipulation of resources to modify CPU consumption to encode a steganographic message, according to some embodiments of this disclosure.

In some embodiments, the VM 110 may use usage data 140 related to CPU consumption to encode the steganographic message 150. FIG. 2 is another block diagram of the messaging system 100, illustrating the manipulation of resources to modify CPU consumption to encode the desired steganographic message 150, according to some embodiments of this disclosure.

As shown, the resource manipulator 170 may be in communication with the message encoder 160. Upon instruction from the message encoder 160 to manipulate CPU consumption to encode a desired steganographic message 150, the resource manipulator 170 may identify an idle worker thread 210 and may cause the idle worker thread 210 to perform additional work, so as to modify the selected bits of the usage data 140 related to CPU consumption. For example, and not by way of limitation, if the steganographic message 150 desired requires a value of 1 for a least significant bit of a byte being sent as part of the usage data 140, the resource manipulator 170 may cause the worker thread 210 to work just enough to increase that byte so as to give the final bit a value of 1. The increased work of the worker thread may be recorded as additional CPU consumption and thus incorporated into the usage data 140 being observed by the hypervisor 120. This usage data 140 may thus include the steganographic message 150 formed based in part on the artificially increased CPU consumption created by the worker thread 210. Because general steganographic techniques are well known in the art, one of skill in the art will understand how to form the desired steganographic message 150.

Figure 3:
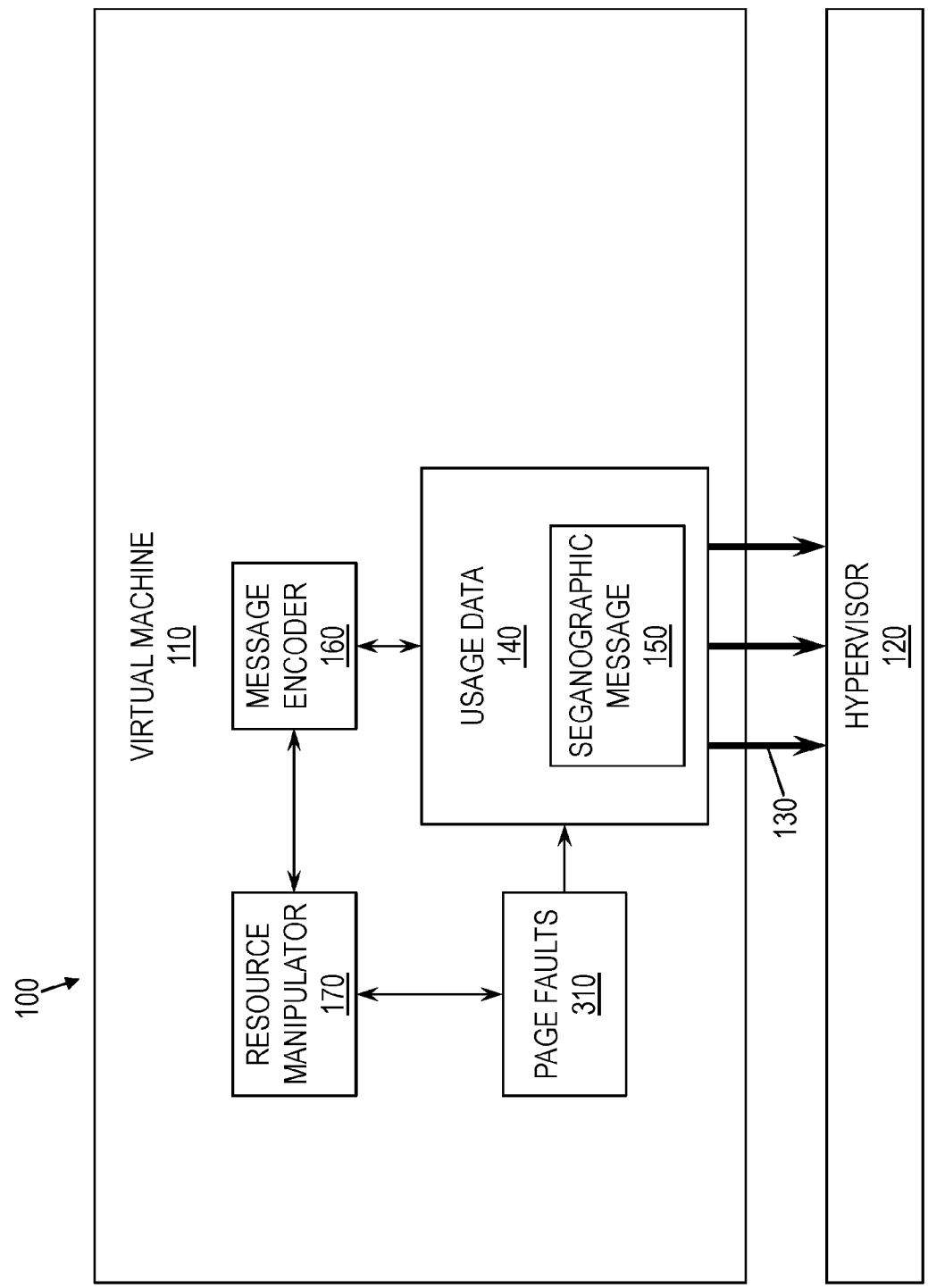
FIG. 3 is yet another block diagram of the messaging system, illustrating the manipulation of resources to induce page faults to encode the steganographic message, according to some embodiments of this disclosure.

In some embodiments, the VM 110 may use usage data 140 related to page faulting to provide the steganographic message 150. FIG. 3 is another block diagram of the messaging system 100, illustrating the manipulation of resources to induce page faults to encode the desired steganographic message 150, according to some embodiments of this disclosure.

As shown, once again, the resource manipulator 170 may be in communication with the message encoder 160. Upon instruction from the message encoder 160 to induce page faults 310 to encode a desired steganographic message 150, the resource manipulator 170 may induce page faults 310 as needed to modify the selected bits of the usage data 140. For example, and not by way of limitation, if the steganographic message 150 desired requires a value of 1 for a least significant bit of a byte being observed by the hypervisor 120 as part of the usage data 140, the VM 110 may induce enough page faults 310 to increase that byte so as to give the final bit a value of 1.

Generally, the "present" bit in the page table entry (PTE) for a page indicates whether that page is currently in memory. A page fault 310 may be induced by clearing the present bit for the page in question, while leaving the page in memory and the necessary kernel data structures in place so that the kernel recognizes the page as no longer present. In the case of International Business Machine's x86 architecture, there exists an "accessed" flag, which is bit 5 in the PTE for a page, and which is set whenever the PTE is used in a linear address translation. By clearing this bit, the hardware will indicate that the page was touched. If the translation lookaside buffer (TLB) entry for the page is also cleared, subsequent access to the page will trigger a page fault 310. Using these or other techniques, the resource manipulator 170 of VM 110 may induce one or more page faults 310 in purposeful patterns so as to form a steganographic message 150 in the usage data 140 related to page faults 310.

Figure 4:
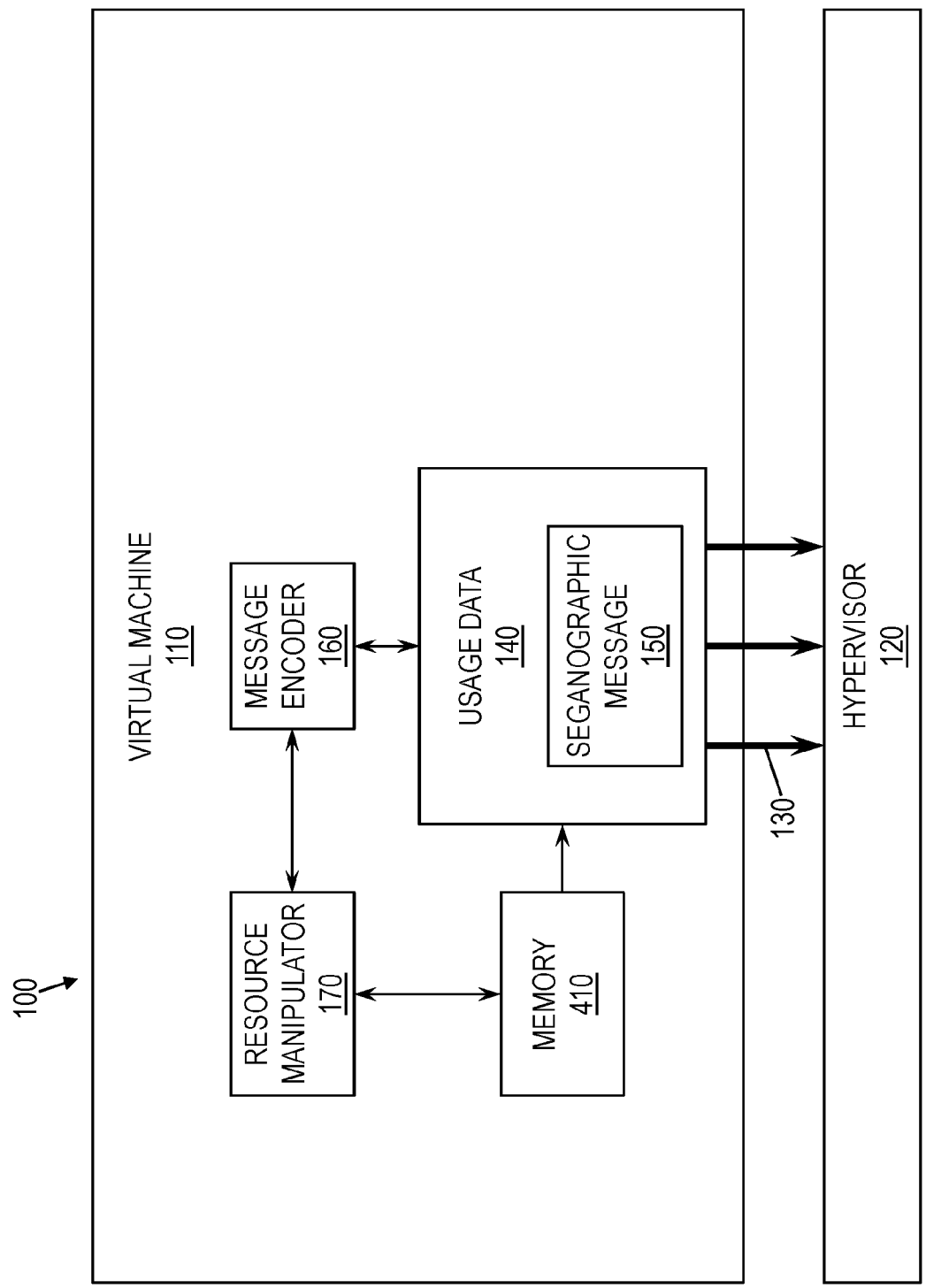
FIG. 4 is another block diagram of the messaging system, illustrating the manipulation of resources to write or read additional bytes to encode the steganographic message, according to some embodiments of this disclosure.

In some embodiments, the VM 110 may use usage data 140 related to bytes written to memory 410 for the purpose of providing the steganographic message 150. FIG. 4 is another block diagram of the messaging system 100, illustrating the manipulation of resources to write or read additional bytes to encode the desired steganographic message 150, according to some embodiments of this disclosure.

As shown, once again, the resource manipulator 170 may be in communication with the message encoder 160. Upon instruction from the message encoder 160 to write additional bytes to memory 410 to encode a desired steganographic message 150, the resource manipulator 170 may write one or more additional bytes to memory 410 until the selected bits of the usage data 140 reach values corresponding to the desired steganographic message 150. For example, and not by way of limitation, if the steganographic message 150 desired requires a value of 1 for a final bit of a byte being observed by the hypervisor 120 as part of the usage data 140, the VM 110 may write additional bytes to memory 410 as needed to give that final bit a value of 1.

The messaging system 100 may manipulate the writing or reading of bytes to a network adapter or to a memory subsystem. Thus, although the example of FIG. 4 refers to bytes being written to memory, it will be understood that the messaging system 100 may also manipulate the reading of bytes, and that such reading or writing of bytes being manipulated may occur at network adapter, rather than at the memory 410.

Figure 5:
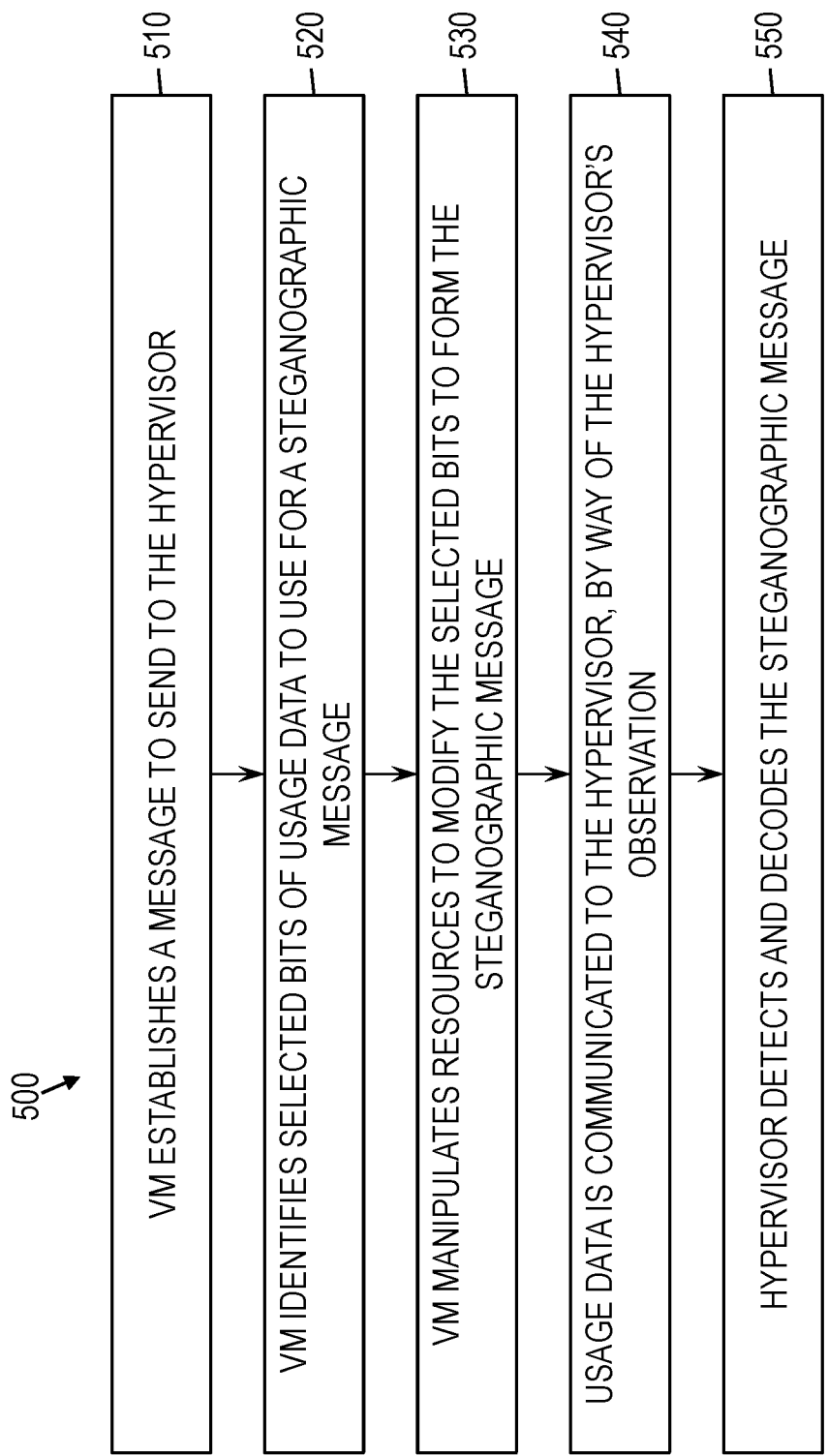
FIG. 5 is a flow diagram of a method for providing the steganographic message to a hypervisor, according to some embodiments of this disclosure.

FIG. 5 is a flow diagram of a method 500 for providing a steganographic message 150 to a hypervisor 120, according to some embodiments of this disclosure. At block 510, the VM 110 may establish a message it desires to send to the hypervisor 120 as a steganographic message 150. At block 520, the VM 110 may identify one or more selected bits in the usage data 140. At block 530, the VM may manipulate its resources to modify the selected bits to correspond to bits of the message, thus forming a steganographic message 150. At block 540, the usage data 140 may be communicated to the hypervisor 120 across the communication channels 130, by way of the hypervisor's observation. At block 550, the hypervisor 120 may detect and decode the steganographic message 150.

Figure 6:
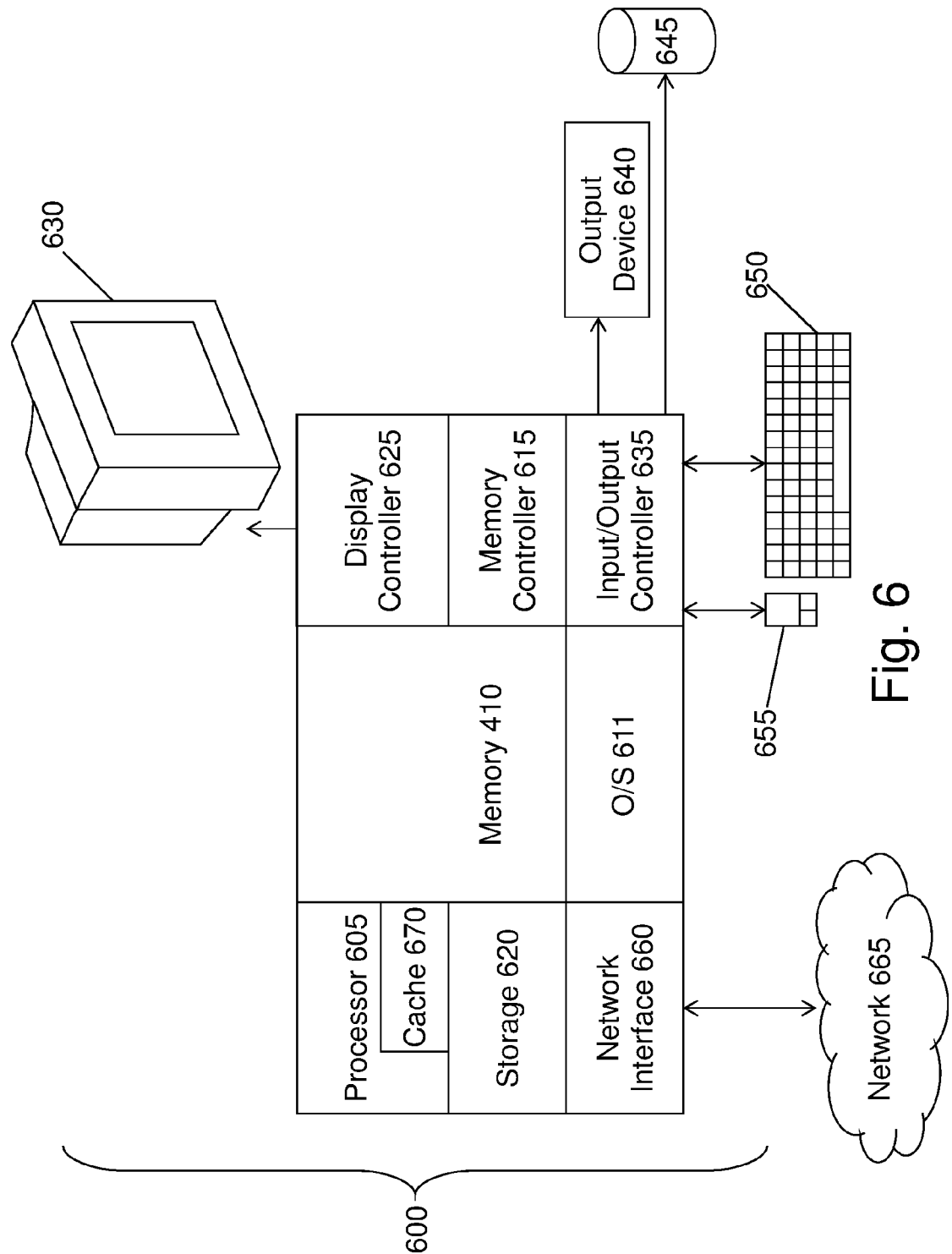
FIG. 6 is a block diagram of a computer system for implementing some or all aspects of the messaging system, according to some embodiments of this disclosure.

FIG. 6 illustrates a block diagram of a computer system 600 for use in implementing a messaging system 100 or method 500 according to some embodiments. The messaging systems 100 and methods 500 described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the hypervisor 120 may run on the computer system 600, and the virtual machine 110 may run over the hypervisor 120 within the computer system 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the messaging systems 100 and methods 500 of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Messaging systems and methods according to this disclosure may be embodied, in whole or in part, in computer program products or in computer systems 600, such as that illustrated in FIG. 6.

Technical effects and benefits of some embodiments include the ability to use steganography to hide messages in the selected bits of standard communications between a virtual machine 110 and a hypervisor 120. With some embodiments of the messaging system 100, an administrator may thus avoid installing a specialized agent for message passing.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    encoding, by a computer processor, a steganographic message in usage data of a virtual machine, wherein the usage data comprises two or more segments of streaming data communicated to a hypervisor over two or more communication channels, and wherein each communication channel of the two or more communication channels is associated with a resource metric of the usage data, and wherein the encoding comprises:
    identifying a plurality of selected bits spanning the two or more segments of the streaming data of the usage data of the virtual machine and communicated across the two or more communication channels, wherein the plurality of selected bits comprise one or more of the least significant bits of each segment of the two or more segments of the streaming data of the usage data;
    determining a value by which to increase central processing unit (CPU) consumption described in a first portion of the usage data communicated across a first communication channel of the two or more communication channels to encode a desired message as the steganographic message in the plurality of selected bits spanning the two or more segments of the streaming data of the usage data;
    directing work to an idle worker thread to selectively increase the CPU consumption by the value to modify the plurality of selected bits spanning the two or more segments of the streaming data of the usage data, wherein the directing encodes the desired message as the steganographic message in the plurality of selected bits spanning the two or more segments of the streaming data of the usage data;
    increasing a second resource metric described in a second portion of the usage data communicated over a second communication channel of the two or more communication channels to encode the desired message as the steganographic message in the plurality of selected bits spanning the two or more segments of the usage data; and
    providing the two or more segments of the streaming data of the usage data to the hypervisor, wherein the providing the two or more segments is performed without installing a messaging agent for communicating non-usage data on the virtual machine, the steganographic message being observable by the hypervisor in the streaming data of the usage data.

2. The computer-implemented method of claim 1, wherein the increasing the second resource metric described in the second portion of the usage data communicated over the second communication channel of the two or more communication channels to encode the desired message as the steganographic message in the plurality of selected bits spanning the two or more segments of the usage data comprises:
    determining the second value by which to increase a page fault counter described in the usage data to encode the desired message as the steganographic message in the plurality of selected bits of the usage data; and
    directing a resource manipulator to induce a page fault to selectively increase the page fault counter by the second value to modify the plurality of selected bits of the usage data.

3. The computer-implemented method of claim 1, wherein the increasing the second resource metric described in the second portion of the usage data communicated over the second communication channel of the two or more communication channels to encode the desired message as the steganographic message in the plurality of selected bits spanning the two or more segments of the usage data comprises:
    determining the second value by which to increase memory bytes written described in the usage data to encode the desired message as the steganographic message in the plurality of selected bits of the usage data; and
    directing a resource manipulator to write one or more bytes to memory to selective increase the memory bytes written to modify the plurality of selected bits of the usage data.

4. The computer-implemented method of claim 1, wherein the encoding the steganographic message in the usage data of the virtual machine further comprises:
    encrypting the desired message; and
    encoding an encrypted version of the message as the steganographic message.

5. The computer-implemented method of claim 1, further comprising repeating the desired message by encoding the desired message as the steganographic message in a second plurality of selected bits following the plurality of selected bits in the usage data.

6. The computer-implemented method of claim 1, wherein the encoding the steganographic message in the usage data of the virtual machine further comprises modifying a selected bit in the usage data to indicate a start of the steganographic message.

* * * * *